2,893,986

AZO DYES CONTAINING THE BENZONAPHTHO-FURANOL NUCLEUS

Robert S. Long and Bennett G. Buell, Bound Brook, N.J., assignors to American Cyanamid Company, New York, N.Y., a corporation of Maine No Drawing. Application March 8, 1957
Serial No. 644,732

10 Claims. (Cl. 260—152)

This invention relates to azo dyes containing as the residue of a coupling component a substituted alpha-benzonaphthofuran having the following formula

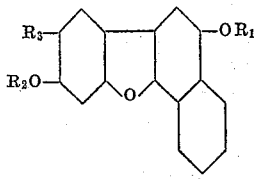

in which $R_1$ and $R_2$ may be hydrogen and lower alkyl; and $R_3$ may be hydrogen, carboxy, or RNHCO— wherein R represents the residue of a mononuclear aromatic carbocyclic primary amine. The alpha-benzonaphthofuran ring which is sometimes known as alpha-brazan is normally numbered as follows

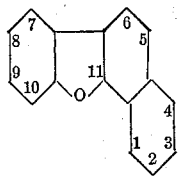

This numbering and momenclature will be used throughout the specification and claims.

The compounds of the present invention may be considered to have the following formula

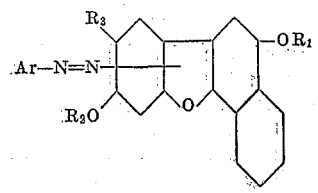

in which $R_1$ and $R_2$ may be hydrogen, lower alkyl, or acyl, and $R_3$ may be hydrogen, carboxy, or carboxyarylide and Ar is a residue of a diazotized aromatic carbocyclic primary amine having not more than two benzene rings. In the case of most of the compounds the coupling takes place at the 10 carbon atom although where $R_3$ is hydrogen coupling at the 8 carbon atom may also be obtained.

A convenient starting point for coupling components of the present invention is 5,9-dihydroxy-alpha-benzonaphthofuran which has the following formula

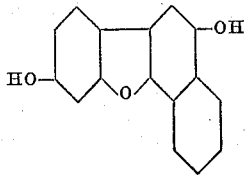

This compound is itself a coupling component and azo dyes may be prepared from it. However, still more important shades may be obtained by alkylation under conditions which normally alkylate alpha-hydroxynaphthalenes to produce 5-alkoxy-9-hydroxy-alpha-benzonaphthofurans. These also are good coupling components and can be used as such or can be further carbonated by the Kolbe reaction to produce 5-alkoxy-9-hydroxy-8-carboxy-alpha-benzonaphthofurans, which in turn can be transformed into their arylides by conventional reactions. The arylides form excellent ice-color coupling components which couple with the ordinary diazotized fast bases. In the case of these compounds the coupling takes place at the 10 carbon atom. Instead of first preparing the dihydroxy-alpha-benzonaphthofuran it is also possible to start with a resorcinol monoether in which the hydrogen of one of the 2-hydroxyl groups is replaced by a lower alkyl group such as methyl, ethyl, propyl, isopropyl, butyl, amyl, and the like. This results in producing a 5-hydroxy-benzonaphthofuran which couples in the 6 position. For this reason the azo group in the typed formula for the dyes above is shown as going into the center of the ring system signifying that the coupling may be either on the benzene ring or on the naphthalene ring depending on the nature of the $R_1$ and $R_2$ radicals.

The dyes of the present invention and particularly those having a 8-carboxyarylide are desirable deep shades such as various tints of brown.

Alkylation of the 5,9-dihydroxybenzonaphthofuran may be carried out by heating the compound with the desired alcohol in the presence of sulfuric acid: any of the lower alkanols may be used such as methanol, ethanol, propanol, iso-propanol, butanol, iso-butanol, or any of the amyl alcohols. This alkylation procedure produces the 5-alkoxy-9-hydroxy-alpha-benzonaphthofuran and compounds of this type when coupled with diazotized fast bases couple into the benzene ring rather than the naphthalene ring. The ease with which coupling takes place is a very important property of the dyes of the present invention. There are no hydroxy groups ortho or para to the hydroxy group which directs the coupling and there is no danger of attacking the diazonium salt itself.

The invention will be illustrated in greater detail in conjunction with the following specific examples. The parts are by weight unless otherwise specified.

*Example 1*

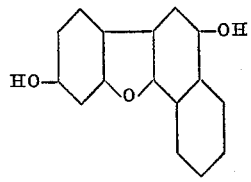

A solution of 60 parts of naphthoquinone in 400 parts of acetic acid is added to a solution of 34.5 parts of resorcinol in 150 parts of acetic acid. To the resulting mixture at 50° C. is added about 3 parts of 50% sulfuric acid. The mixture is slowly heated to reflux and held at reflux until the reaction is substantially complete. The reaction mixture is then allowed to cool and after clarifying, if necessary, it is drowned in water. The solid product is isolated by filtration and washing, and dried at 70° C. For purification, the product is then dissolved in 90 parts of dry pyridine and 200 parts of dry benzene. 94 parts of acetic anhydride is added and the mixture is stirred at reflux until acylation is complete. The mixture is then cooled and the diacetylated product is isolated by filtration and washed with benzene and petroleum ether. The cake is dried at 70° C. and slurried in 600 parts of methanol. The mixture is heated to the boil and 166 parts of 20% sodium hydroxide solution is added. The mixture is stirred and heated until a clear solution is obtained. It is then cooled and added to a solution of 160 parts of concentrated hydrochloric acid in 500 parts of 50% aqueous ethanol. The white curdy product is isolated by filtration, washed with water, and dried. It is shown by analysis and by quantitative acetylation to be a pure dihydroxy compound. It analyzes correctly and has a melting point of 215–217° C.

Example 2

The product of Example 1 is padded on pieces of cotton cloth which are then immersed in baths containing various diazotized amines. The dyed cloths are observed to have the following shades:

| | |
|---|---|
| 3,3'-dimethoxybenzidine | Brownish black |
| 2-methoxy-5-nitroaniline | Red brown |
| 2-nitro-4-methoxyaniline | Blue brown |
| 2,5-dichloraniline | Red brown |
| m-Chloroaniline | Khaki |
| 2-methoxy-4-nitroaniline | Blue brown |

Example 3

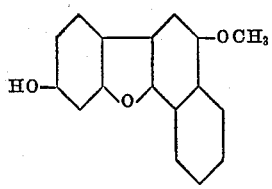

A mixture of 7 parts of the product of Example 1, 7 parts of anhydrous methanol and 2.8 parts of concentrated sulfuric acid is heated at a slight positive pressure at 125° C. until the reaction is substantially complete. A substantial solidification of the reaction mixture occurs and the reaction mixture is therefore diluted with about 150 parts of water. Twenty-two parts of 20% sodium hydroxide solution is then added. The product is salted to precipitate the sodium salt. This is filtered, washed with brine, and then taken up in 200 parts of water containing a smaller amount of sodium hydroxide. The mixture is heated to effect complete solution and acetic acid is then added gradually to precipitate the free hydroxy compound. The light gray precipitate is filtered, washed, and dried. The crude product is then recrystallized from methanol and water producing a product of good purity.

The procedure of the above example is repeated replacing methanol with an equivalent amount of ethanol. The process proceeds smoothly and the corresponding 5-ethoxy derivative is obtained. In a similar manner the process is repeated respectively with propanol, iso-propanol, butanol and amyl alcohol, in each case the reaction proceeds smoothly and the corresponding 5-ethoxy, 5-propoxy, 5-isopropoxy, 5-butoxy, and 5-amyloxy derivatives result.

Example 4

The products of Example 3 are impregnated on pieces of cloth and then immersed in solutions of the following diazotized amines, the colors produced being as designated.

| | |
|---|---|
| 2-methoxy-4-nitroaniline | Tan |
| 3,3'-dimethoxybenzidine | Light brown |
| 2-aminoanthraquinone | Dull tan |
| 2,5-dichloraniline | Yellow brown |
| 2-methoxy-5-nitroaniline | Tan |
| 2-naphthylamine | Yellow brown |
| 1-naphthylamine | Brown |

Example 5

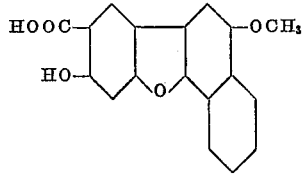

A mixture of 10 parts of the products of Example 3, 60 parts of anhydrous potassium carbonate, and 60 parts of inert substance, such as glass beads or sand, is agitated at 160–165° C. under about 300 p.s.i. pressure of carbon dioxide until carbonation is substantially complete. The product is isolated by leaching out with aqueous alkali followed by acidification of the solution. It is a gray solid of melting point 242–245° C. Further purification is effected by salting out the sodium salt from strongly alkaline solution followed by acidification of the precipitate to form the free acid. The crude product obtained is not 100% the isomer represented by the formula. It appears to be contaminated by small amounts of a product which has such close properties that it is most probably the isomer in which the carboxy group is attached to the 10 carbon atom. The amount of contaminant is insufficient to have any significant effect on the dyestuffs prepared from the coupling component.

Example 6

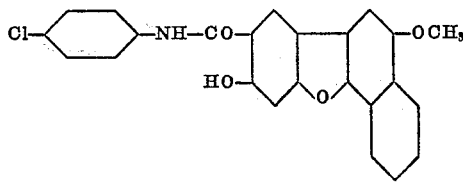

To a mixture of 2.79 parts of the products of Example 5, 1.35 parts of para-chloroaniline, and 34 parts of toluene is added 0.84 part of phosphorous trichloride with stirring at 60° C. It is then heated at reflux with stirring until the reaction is complete, cooled, and the cream-colored solid filtered. After purification by reprecipitation from alkali (after clarification) an almost white solid, M.P. 288°–292° C. is obtained. The product is then further purified by recrystallization from mono-chlorobenzene or xylene producing light yellow crystals having a somewhat higher melting point.

Example 7

The product of Example 6 is padded on pieces of cloth and the latter are then immersed in solutions of diazotized amines, with the following results

| | |
|---|---|
| 2-methoxy-4-nitroaniline | Olive |
| 2-methoxy-5-nitroaniline | Olive green |
| 2,5-dichloroaniline | Olive tan |

Example 8

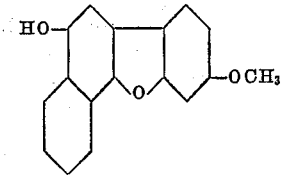

Five parts of m-methoxyphenol and 6.8 parts of alpha-naphthoquinone are dissolved in 40 parts of glacial acetic acid and 1.5 part of 1:1-sulfuric acid is added. The solution is heated at reflux until the reaction is complete. It is then cooled and drowned in 500 parts of a mixture of ice and water. The solid is filtered off, washed with water and dried in vacuo. The crude product melts at 75–92° C.

The product is taken up in 30 parts of pyridine and acetylated with 10 parts of acetic anhydride. The resulting tan solid is purified by repeated recrystallizations from ethanol to give a product melting at 146–148° C. and having the correct composition by analysis for the acetyl derivative. Saponification of this ester in dilute alkali gives the free phenol. The process of the above example is repeated respectively with equivalent amounts of 3-ethoxyphenol and 3-butoxyphenol in place of the 3-methoxyphenol, the corresponding 9-alkoxy-5-hydroxy-alpha-benzonaphthofurans are obtained in good yield.

*Example 9*

The products from Example 8 are used as a coupling component to form azo dyes with the following diazotized amines. The colors obtained are shown.

p-Nitroaniline _____ Olive-gray
o-Methoxy-p-nitroaniline _____ Gray
p-Chloraniline _____ Red-brown This application is in part a continuation of our copending application Serial No. 414,866, filed March 8, 1954.

We claim:

1. Azoic coloring matters having the following formula

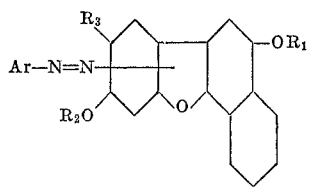

in which $R_1$ and $R_2$ are selected from the group consisting of hydrogen and the lower alkyl radicals and $R_3$ is selected from the group consisting of hydrogen, carboxy, and RNHCO— wherein R is the residue of a mononuclear aromatic carbocyclic primary amine, and Ar is the residue of a diazotized aromatic carbocyclic primary amine having a residual cyclic structure selected from those of the group consisting of benzene, naphthalene, diphenyl and anthraquinone.

2. Azoic coloring matters having the following formula

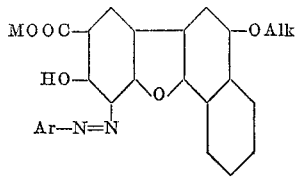

in which Ar is the residue of a diazotized aromatic carbocyclic primary amine having a cyclic structure selected from those of the group consisting of benzene, naphthalene, diphenyl and anthraquinone, Alk is lower alkyl and M is a cation selected from the group consisting of hydrogen and the alkali metals.

3. Azoic coloring matters having the formula

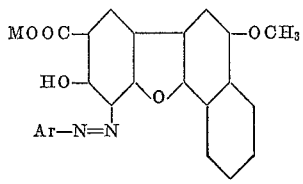

in which Ar is the residue of a diazotized aromatic carbocyclic primary amine having a cyclic structure selected from those of the group consisting of benzene, naphthalene, diphenyl and anthraquinone and M is a cation selected from the group consisting of hydrogen and the alkali metals.

4. Azoic coloring matters having the following formula

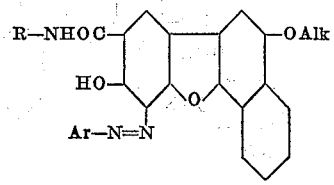

in which Ar is the residue of a diazotized aromatic carbocyclic primary amine having a cyclic structure selected from those of the group consisting of benzene, naphthalene, diphenyl and anthraquinone, R is a residue of a mononuclear aromatic carbocyclic primary amine and Alk is lower alkyl.

5. Azoic coloring matters having the following formula

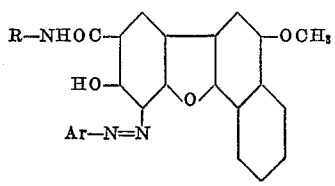

in which Ar is the residue of a diazotized aromatic carbocyclic primary amine having a cyclic structure selected from those of the group consisting of benzene, naphthalene, diphenyl and anthraquinone, and R is residue of a mononuclear aromatic carbocyclic primary amine.

6. Azoic coloring matters having the following formula

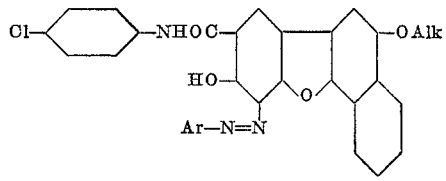

in which Ar is the residue of a diazotized aromatic carbocyclic primary amine having a cyclic structure selected from those of the group consisting of benzene, naphthalene, diphenyl and anthraquinone and in which Alk is lower alkyl.

7. Azoic coloring matters having the following formula.

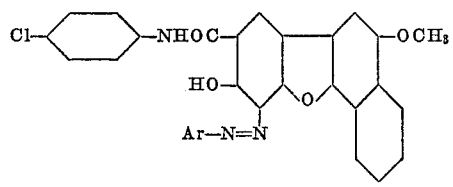

in which Ar is the residue of a diazotized aromatic carbocyclic primary amine having a cyclic structure selected from those of the group consisting of benzene, naphthalene, diphenyl and anthraquinone.

8. An azoic coloring matter having the following formula

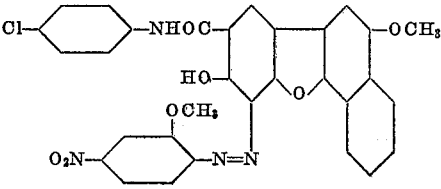

9. An azoic coloring matter having the following formula
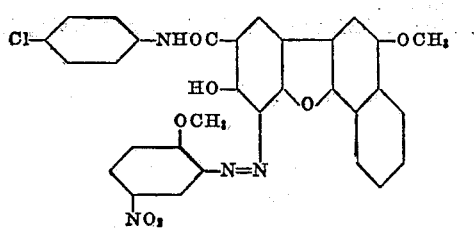
10. An azoic coloring matter having the following formula
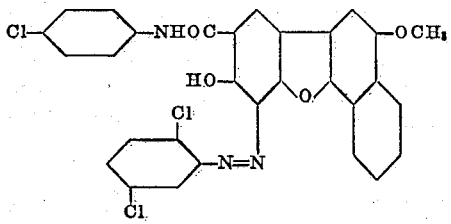
References Cited in the file of this patent
UNITED STATES PATENTS
| | | |
|---|---|---|
| 1,936,926 | Zahn et al. | Nov. 28, 1933 |
| 2,496,255 | Glahn | Jan. 31, 1950 |